(12) United States Patent
Lee et al.

(10) Patent No.: US 10,613,683 B2
(45) Date of Patent: Apr. 7, 2020

(54) TOUCH DISPLAY DEVICE AND METHOD OF DRIVING THE SAME

(71) Applicant: LG Display Co., Ltd., Seoul (KR)

(72) Inventors: Myoung-Hwa Lee, Paju-si (KR); Jung-Gon Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/127,527

(22) Filed: Sep. 11, 2018

(65) Prior Publication Data

US 2019/0079636 A1    Mar. 14, 2019

(30) Foreign Application Priority Data

Sep. 11, 2017  (KR) .................. 10-2017-0116052

(51) Int. Cl.
 *G06F 3/041* (2006.01)
 *G06F 3/044* (2006.01)
(52) U.S. Cl.
 CPC ............ *G06F 3/0418* (2013.01); *G06F 3/044* (2013.01); *G06F 3/0412* (2013.01); *G06F 3/04184* (2019.05); *G06F 3/0443* (2019.05)

(58) Field of Classification Search
 None
 See application file for complete search history.

(56) References Cited

U.S. PATENT DOCUMENTS

| | | | |
|---|---|---|---|
| 2015/0138144 A1* | 5/2015 | Tanabe | G06F 3/045 345/174 |
| 2016/0179273 A1* | 6/2016 | Lee | G06F 3/0416 345/174 |
| 2016/0357327 A1* | 12/2016 | Chang | G06F 3/0418 |

* cited by examiner

*Primary Examiner* — Joseph R Haley
(74) *Attorney, Agent, or Firm* — Morgan, Lewis & Bockius LLP

(57) ABSTRACT

A touch display device includes: a touch display panel displaying an image and sensing a touch input; a plurality of touch electrodes in the touch display panel; a plurality of touch lines connected to the plurality of touch electrodes, respectively; a plurality of MUXs connected to the plurality of touch lines, each of the plurality of MUXs transmitting a touch scan signal to at least two of the plurality of touch electrodes simultaneously and receiving a touch sensing signal from at least two of the plurality of touch electrodes; a signal processing part calculating a touch variance from the touch sensing signal; and a coordinate calculating part calculating coordinates of the touch input from the touch variance.

10 Claims, 3 Drawing Sheets

TOUCH DISPLAY DEVICE AND METHOD OF DRIVING THE SAME

CROSS-REFERENCE TO RELATED APPLICATIONS

This patent application claims the benefit under 35 U.S.C. § 119(a) of Republic of Korea Patent Application No. 10-2017-0116052, filed on Sep. 11, 2017, in the Korean Intellectual Property Office, which is incorporated herein by reference in its entirety.

BACKGROUND

Technical Field

The present disclosure relates to a touch display device, and more particularly, to a touch display device where reduction in touch accuracy due to a transient noise is prevented by sequential and overlapping driving of a plurality of touch electrodes and a method of driving the touch display device.

Discussion of the Related Art

As an information society progresses, display devices have rapidly advanced and various flat panel displays (FPDs) have been developed. For example, the FPDs include a liquid crystal display (LCD) device, a plasma display panel (PDP) device, an organic light emitting diode (OLED) display device and a field emission display (FED) device. Since the FPDs have advantages such as a thin profile, a light weight and a low power consumption, cathode ray tube (CRT) devices have been widely substituted by the FPDs.

Recently, a touch display device where a touch panel is disposed over a display panel has been a subject of research. The touch display device is used as an output unit displaying an image and as an input unit receiving an order of a user by a touch of a specific portion of the image. The touch panel may be classified into a pressure sensing type, a capacitance type, an infrared type and an ultrasonic type according to a sensing type.

When a user watches the image displayed by the display panel and touches the touch panel, the touch panel detects a position information of the corresponding portion and recognizes an order of the user by comparing the detected position information with a position information of the image.

The touch display device may be fabricated such that an individual touch panel is attached to a display panel. Recently, for slimness of a portable terminal such as a smart phone and a tablet PC, a demand for an in-cell touch display device where a touch panel and a display panel are integrated by using an electrode or a line for the display panel as an electrode and a line for the touch panel has increased.

FIG. 1 is a plan view showing an in-cell touch display device according to the related art. Specifically, FIG. 1 shows a self-capacitance type in-cell touch display device.

In FIG. 1, a self-capacitance type in-cell touch display device 10 according to the related art includes a touch display panel 20 and a touch display driving unit 30.

The touch display panel 20 displays an image and senses a touch. For sensing a touch, the touch display panel 20 includes a plurality of touch electrodes TE11 to TE58 and a plurality of touch lines TL11 to TL58 connecting the plurality of touch electrodes TE11 to TE58 and the touch display driving unit 30. The plurality of touch electrodes TE11 to TE58 may be disposed in a matrix of 5 rows by 8 columns.

The touch display driving unit 30 senses a position of a touch. The touch display driving unit 30 applies a touch scan signal to the plurality of touch electrodes TE11 to TE58 and detects the position of the touch by analyzing a change in a capacitance of the plurality of touch electrodes TE11 to TE58 according to the touch scan signal.

The touch display driving unit 30 includes a plurality of multiplexers (MUXs) 32, an analog front end part 34, an analog-digital converting part 36 and a signal processing part 38.

An input terminal 32a of each of the plurality of MUXs 32 is connected to the plurality of touch lines TL11 to TL58, and an output terminal 32b of each of the plurality of MUXs 32 is connected to the analog front end part 34. The input terminal 32a and the output terminal 32b of the plurality of MUXs 32 are sequentially connected.

For example, the plurality of MUXs may include first to eighth MUXs, a channel ratio of the input terminal 32a and the output terminal 32b of each of the first to eighth MUXs is 5:1, and the output terminal 32b is sequentially connected to one of the five input terminals 32a.

The input terminal 32a of the first MUX is connected to the $11^{th}$ to $51^{st}$ touch lines TL11 to TL51 respectively connected to the $11^{th}$ to $51^{st}$ touch electrodes TE11 to TE51 of the first column of the touch display panel 20, and the output terminal 32b of the first MUX is sequentially connected to the input terminals 32a of the first MUX.

As a result, the first MUX sequentially transmits the touch scan signal to the $11^{th}$ to $51^{st}$ touch lines TL11 to TL51 of the first column and sequentially transmits a touch sensing signal of the $11^{th}$ to $51^{st}$ touch lines TL11 to TL51 of the first column to the analog front end part 34.

Similarly to the first MUX, the second to eighth MUXs are connected to corresponding touch lines of $12^{th}$ to $58^{th}$ touch lines TL12 to TL58, respectively.

The analog front end part 34 transmits the touch sensing signal to the analog-digital converting part 36. The analog-digital converting part 36 converts the touch sensing signal of an analog type to the touch sensing signal of a digital type and transmits the touch sensing signal of the digital type to the signal processing part 38.

The signal processing part 38 calculates a touch variance from the touch sensing signal and judges a touch presence from the touch variance.

The touch display driving unit 30 calculates coordinates of a touch input from the touch variance.

The self-capacitance type in-cell touch display device 10 is driven by classifying one frame into a display period for displaying an image and a touch period for sensing a touch.

The touch display driving unit 30 classifies the touch period into a plurality of MUX periods where the plurality of MUXs 32 transmit the touch scan signal to the plurality of touch electrodes, respectively. The touch display driving unit 30 transmits the touch scan signal to one of the plurality of touch electrodes many times during each of the plurality of MUX periods and detects the touch sensing signal many times to calculate the touch variance.

TABLE 1 is a table showing a touch electrode where a touch scan signal is applied and a touch sensing signal is detected during a plurality of MUX periods of a self-capacitance type in-cell touch display device according to the related art.

TABLE 1

| Period | MP1 | MP2 | MP3 | MP4 | MP5 |
|---|---|---|---|---|---|
| Sensing Electrode | TE11 | TE21 | TE31 | TE41 | TE51 |

In TABLE 1 and FIG. 1, the first MUX of the touch display driving unit 30 transmits a pulse of the touch scan signal to the 11$^{th}$ touch electrode TE11 10 times during a first MUX period MP1 of the touch period and transmits the corresponding touch sensing signal from the 11$^{th}$ touch electrode TE11 to the analog front end part 34 10 times. The signal processing part 38 of the touch display driving unit 30 calculates a capacitance variation of the touch variance from an average value of the touch sensing signals of 10 times.

Similarly, the first MUX of the touch display driving unit 30 transmits a pulse of the touch scan signal to the 21$^{st}$ to 51$^{st}$ touch electrodes TE21 to TE51 10 times during second to fifth MUX periods MP2 to MP5, respectively, of the touch period and transmits the corresponding touch sensing signal from the 21$^{st}$ to 51$^{st}$ touch electrodes TE21 to TE51 to the analog front end part 34 10 times. The signal processing part 38 of the touch display driving unit 30 calculates a capacitance variation of the touch variance from an average value of the touch sensing signals of 10 times.

Accordingly, the plurality of MUXs 32 of the touch display driving unit 30 transmit the touch scan signal to one of the plurality of touch electrodes TE11 to TE58 many times during the plurality of MUX periods, respectively, of the touch period and transmit the touch sensing signal from one of the plurality of touch electrodes TE11 to TE58 to the analog front end part 34 many times. The signal processing part 38 of the touch display driving unit 30 calculates the touch variance from the average value of the touch sensing signals of the many times.

When a transient noise component is inputted to the touch display device, the noise component causes an interference and a distortion of the touch sensing signal to generate an error in calculation of the touch variance.

Specifically, when the number of detection of the touch sensing signal is relatively small, the error in calculation of the touch variance increases to reduce the accuracy of touch detection.

When the number of detection of the touch sensing signal increases to prevent the reduction of accuracy, the touch period for sensing a touch increases and the display period for displaying an image decreases. As a result, a display quality of the image is deteriorated.

SUMMARY

Accordingly, embodiments of the present disclosure are directed to a touch display device and method of driving the same that substantially obviates one or more of the problems due to limitations and disadvantages of the related art.

An aspect of the present disclosure is to provide a touch display device where the number of detection of the touch sensing signal increases and the accuracy of touch detection is improved by detecting the touch sensing signal from at least two of the plurality of touch electrodes at the same time and sequentially performing the detection and a method of driving the touch display device.

Another aspect of the present disclosure is to provide a touch display device where the number of detection of the touch sensing signal increases and deterioration of the touch accuracy with respect to a specific frequency is prevented by applying the touch scan signal to at least two of the plurality of touch electrodes with an individual frequency and simultaneously detecting the touch sensing signal from at least two of the plurality of touch electrodes and a method of driving the touch display device.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

It is to be understood that both the foregoing general description and the following detailed description are explanatory, and are intended to provide further explanation of the embodiments as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles.

DETAILED DESCRIPTION

Figure 1:
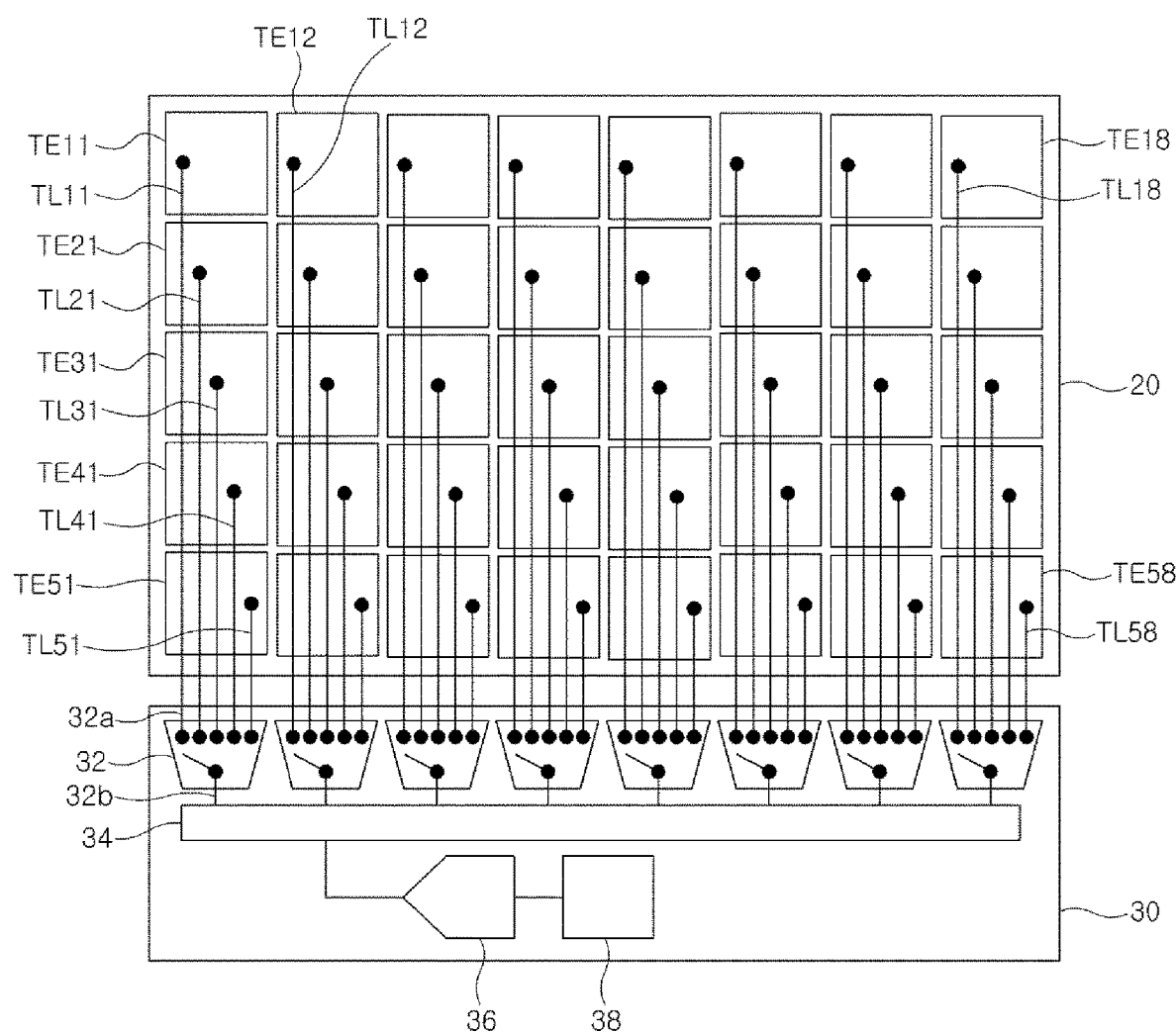
FIG. 1 is a plan view showing an in-cell touch display device according to the related art.

Reference will now be made in detail to embodiments of the present disclosure, examples of which are illustrated in the accompanying drawings. In the following description, when a detailed description of well-known functions or configurations related to this document is determined to unnecessarily cloud a gist of an embodiment of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
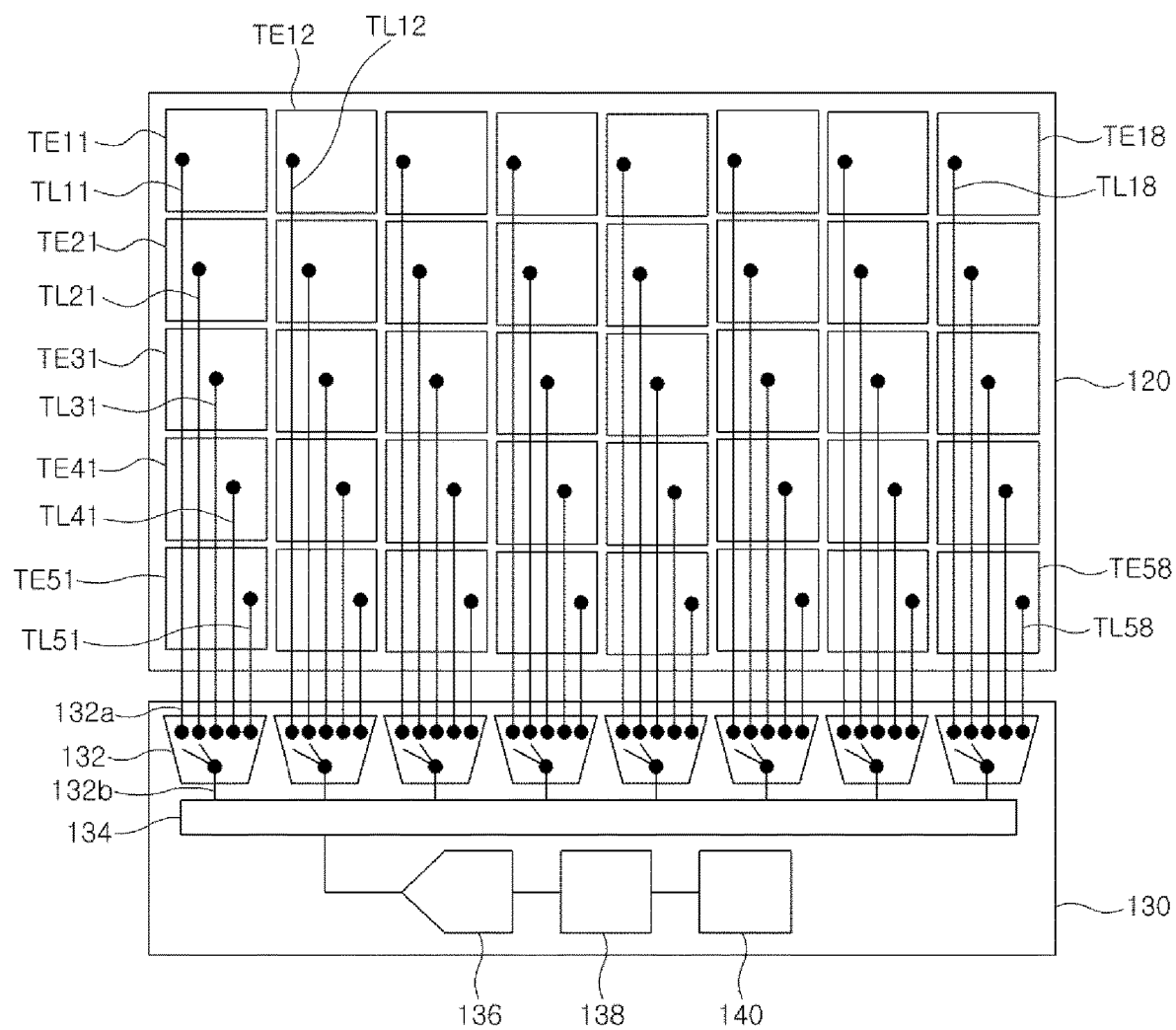
FIG. 2 is a plan view showing an in-cell touch display device according to an embodiment of the present disclosure.

FIG. 2 is a plan view showing an in-cell touch display device according to an embodiment of the present disclosure. Specifically, FIG. 2 shows a self-capacitance type in-cell touch display device.

In FIG. 2, a self-capacitance type in-cell touch display device 110 according to an embodiment of the present disclosure includes a touch display panel 120 and a touch display driving unit 130.

The touch display panel 120 displays an image and senses a touch. For sensing a touch, the touch display panel 120 includes a plurality of touch electrodes TE11 to TE58 and a plurality of touch lines TL11 to TL58 connecting the plurality of touch electrodes TE11 to TE58 and the touch display driving unit 130. The plurality of touch electrodes TE11 to TE58 may be disposed in a matrix of 5 rows by 8 columns.

Although not shown, the touch display panel 120 may include a first substrate, a gate line and a data line on the first substrate, a thin film transistor (TFT) connected to the gate line and the data line, and a pixel electrode connected to the TFT. The gate line and the data line may cross each other to define a pixel region, and the TFT and the pixel electrode may be disposed in the pixel region.

The touch display panel 120 may be an organic light emitting diode (OLED) panel or a liquid crystal (LC) panel. The touch display panel 120 of the OLED panel may further include a light emitting diode (LED) connected to the pixel electrode and a passivation layer on the LED. The touch display panel 120 of the LC panel may further include a second substrate facing and spaced apart from the first substrate, a common electrode on an inner surface of the second substrate and a liquid crystal layer between the first and second substrates.

The touch display driving unit 130 senses a position of a touch. The touch display driving unit 130 applies a touch scan signal TSS (of FIG. 3) to the plurality of touch electrodes TE11 to TE58 and detects a position of the touch by analyzing a variation in capacitance of the plurality of touch electrodes TE11 to TE58 according to the touch scan signal TSS.

The touch display driving unit 130 includes a plurality of multiplexers (MUXs) 132, an analog front end part 134, an analog-digital converting part 136, a signal processing part 138 and a coordinate calculating part 140.

Each of the plurality of MUXs 132 includes a plurality of input terminals 132a and an output terminal 132b. The plurality of input terminals 132a of each of the plurality of MUXs 132 are connected to the plurality of touch lines TL11 to TL58, and the output terminal 132b of each of the plurality of MUXs 132 is connected to the analog front end part 134.

For example, the plurality of MUXs 132 may include first to eighth MUXs, a channel ratio of the plurality of input terminals 132a and the output terminal 132b of each of the first to eighth MUXs is 5:1, and the output terminal 132b is sequentially connected to at least two of the five input terminals 132a.

The plurality of input terminals 132a of the first MUX is connected to the $11^{th}$ to $51^{st}$ touch lines TL11 to TL51 respectively connected to the $11^{th}$ to $51^{st}$ touch electrodes TE11 to TE51 of the first column of the touch display panel 120, and the output terminal 132b of the first MUX is sequentially connected to at least two of the plurality of input terminals 132a of the first MUX.

As a result, the first MUX sequentially transmits the touch scan signal TSS to the $11^{th}$ to $51^{st}$ touch lines TL11 to TL51 of the first column and sequentially transmits a touch sensing signal of the $11^{th}$ to $51^{st}$ touch lines TL11 to TL51 of the first column to the analog front end part 134.

Similarly to the first MUX, the second to eighth MUXs are connected to corresponding touch lines of $12^{th}$ to $58^{th}$ touch lines TL12 to TL58, respectively. The second to eighth MUXs sequentially transmit the touch scan signal TSS to the plurality of touch lines and sequentially transmit the touch sensing signal of the plurality of touch lines to the analog front end part 134.

The analog front end part 134 transmits the touch sensing signal to the analog-digital converting part 136. The analog-digital converting part 136 converts the touch sensing signal of an analog type to the touch sensing signal of a digital type and transmits the touch sensing signal of the digital type to the signal processing part 138.

The signal processing part 138 calculates a touch variance from the touch sensing signal and judges a touch presence from the touch variance.

The coordinate calculating part 140 calculates coordinates of a touch input from the touch variance.

The analog front end part 134, the analog-digital converting part 136 and the signal processing part 138 may constitute a touch data driving part as a source readout integrated circuit (SRIC), and a microcontroller unit (MICOM) may include the coordinate calculating part 140.

Although not shown, the touch display driving unit 130 may further include a timing controlling part, a touch data driving part and a gate driving part.

The timing controlling part may generate a touch synchronization signal TSY (of FIG. 3), an image data, a data control signal and a gate control signal using an image signal and a plurality of timing signals such as a data enable signal, a horizontal synchronization signal, a vertical synchronization signal and a clock transmitted from an external system such as a graphic card and a television system. The timing controlling part may transmit the touch synchronization signal TSY to the MICOM, may transmit the image data and the data control signal to the touch data driving part and may transmit the gate control signal to the gate driving part.

The MICOM may generate the touch scan signal TSS using the touch synchronization signal TSY from the timing controlling part, may transmit the touch scan signal TSS to the touch data driving part and may detect the position of the touch input by analyzing the touch sensing signal from the touch data driving part.

The touch data driving part may generate a data signal (a data voltage) using the data control signal and the image data from the timing controlling part and may apply the data signal to a data line of the touch display panel 120.

The gate driving part may generate a gate signal (a gate voltage) using the gate control signal from the timing controlling part and may apply the gate signal to a gate line of the touch display panel 120.

The gate driving part may have a gate-in-panel (GIP) type such that the gate driving part is formed on a substrate of the touch display panel 120 where the gate line, the data line, the touch lines TL11 to TL58 and the pixel region are formed.

The self-capacitance type in-cell touch display device 110 may be driven by classifying one frame into a display period for displaying an image and a touch period for sensing a touch.

Figure 3:
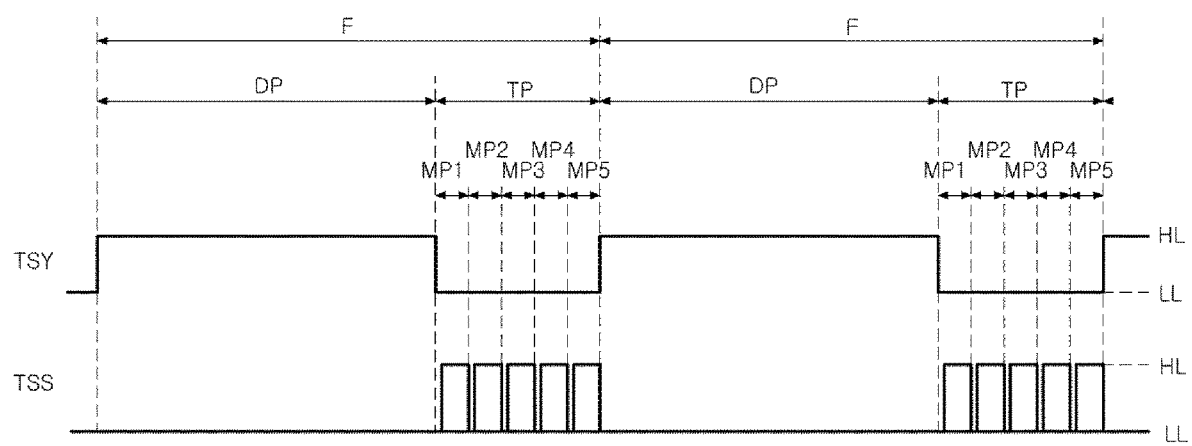
FIG. 3 is a view showing a plurality of signals for an in-cell touch display device according to an embodiment of the present disclosure.

FIG. 3 is a view showing a plurality of signals for an in-cell touch display device according to an embodiment of the present disclosure.

In FIGS. 2 and 3, the touch display device 110 according to an embodiment of the present disclosure is driven by classifying one frame into a display period DP for displaying an image and a touch period TP for sensing a touch. The timing controlling part generates the touch synchronization signal TSY using the plurality of timing signals transmitted from the external system and transmits the touch synchronization signal TSY to the MICOM. The MICOM generates the touch scan signal TSS using the touch synchronization signal TSY and transmits the touch scan signal TSS to the touch data driving part.

The touch synchronization signal TSY has a rectangular wave shape including a high level HL during the display period DP for displaying an image and a low level LL during the touch period TP for sensing a touch.

The touch display driving unit 130 classifies the touch period TP into a plurality of MUX periods MP1 to MP5 where the plurality of MUXs 132 transmit the touch scan signal TSS to the plurality of touch electrodes TE1 to TE58, respectively. During the plurality of MUX periods MP1 to MP5, the touch display driving unit 130 transmits the touch scan signal TSS to at least two of the plurality of touch electrodes TE11 to TE58 many times, respectively, and detects the touch sensing signal many times, respectively, to calculate a touch variance.

TABLE 2 is a table showing a touch electrode where the touch scan signal TSS is applied and a touch sensing signal is detected during the plurality of MUX periods MP1 to MP5 of the self-capacitance type in-cell touch display device 110 according to an embodiment of the present disclosure.

TABLE 2

| Period | MP1 | MP2 | MP3 | MP4 | MP5 |
|---|---|---|---|---|---|
| Sensing Electrode | TE11 + TE21 | TE21 + TE31 | TE31 + TE41 | TE41 + TE51 | TE51 + TE11 |

In TABLE 2 and FIGS. 2 and 3, the first MUX of the touch display driving unit 130 transmits a pulse of the touch scan signal TSS to the $11^{th}$ and $21^{st}$ touch electrodes TE11 and TE21 10 times during a first MUX period MP1 of the touch period TP and transmits the corresponding touch sensing signal from the $11^{th}$ and $21^{st}$ touch electrodes TE11 and TE21 to the analog front end part 134 10 times. The signal processing part 138 of the touch display driving unit 130 may calculate a capacitance variation of the touch variance from an average value of the touch sensing signals of 10 times.

Similarly, the first MUX of the touch display driving unit 130 transmits a pulse of the touch scan signal TSS to the $21^{st}$ and $31^{st}$ touch electrodes TE21 and TE31 10 times during a second MUX period MP2 of the touch period TP and transmits the corresponding touch sensing signal from the $21^{st}$ and $31^{st}$ touch electrodes TE21 and TE31 to the analog front end part 134 10 times. The signal processing part 138 of the touch display driving unit 130 calculates a capacitance variation of the touch variance from an average value of the touch sensing signals of 10 times. In addition, the first MUX of the touch display driving unit 130 transmits a pulse of the touch scan signal TSS to the $31^{st}$ and $41^{st}$ touch electrodes TE31 and T41 10 times during a third MUX period MP3 of the touch period TP and transmits the corresponding touch sensing signal from the $31^{st}$ and $41^{st}$ touch electrodes TE31 and TE41 to the analog front end part 134 10 times. The signal processing part 138 of the touch display driving unit 130 calculates a capacitance variation of the touch variance from an average value of the touch sensing signals of 10 times.

Further, the first MUX of the touch display driving unit 130 transmits a pulse of the touch scan signal TSS to the $41^{st}$ and $51^{st}$ touch electrodes TE41 and TE51 10 times during a fourth MUX period MP4 of the touch period TP and transmits the corresponding touch sensing signal from the $41^{st}$ and $51^{st}$ touch electrodes TE41 and TE51 to the analog front end part 134 10 times. The signal processing part 138 of the touch display driving unit 130 calculates a capacitance variation of the touch variance from an average value of the touch sensing signals of 10 times. Moreover, the first MUX of the touch display driving unit 130 transmits a pulse of the touch scan signal TSS to the $51^{st}$ and $11^{th}$ touch electrodes TE51 and TE11 10 times during a fifth MUX period MP5 of the touch period TP and transmits the corresponding touch sensing signal from the $51^{st}$ and $11^{th}$ touch electrodes TE51 and TE11 to the analog front end part 134 10 times. The signal processing part 138 of the touch display driving unit 130 calculates a capacitance variation of the touch variance from an average value of the touch sensing signals of 10 times.

During the first to fifth MUX periods MP1 to MP5, the touch scan signal TSS is transmitted to at least two of the $11^{th}$ to $51^{st}$ touch electrodes TE11 to TE51, respectively, 10 times and the touch sensing signal is transmitted from at least two of the $11^{th}$ to $51^{st}$ touch electrodes TE11 to TE51, respectively, 10 times. As a result, each of the $11^{th}$ to $51^{st}$ touch electrodes TE11 to TE51 receives the touch scan signal 20 times and transmits the touch sensing signal 20 times.

Since the signal processing part 138 of the touch display driving unit 130 receives the touch sensing signal of each of the $11^{th}$ to $51^{st}$ touch electrodes TE11 to TE51 substantially 20 times to calculate the average value, a possibility of interference and distortion in the touch variance calculated by the signal processing part 138 due to a transient noise component is reduced without elongation of the touch period TP and an accuracy of touch detection is improved.

The driving method during the first to fifth MUX periods MP1 to MP5 may be generalized. Each of the plurality of MUXs may transmit the touch sensing signals of the $n^{th}$ and $(n+1)^{th}$ touch electrodes among the plurality of touch electrodes to the signal processing part 138 during the $n^{th}$ MUX period and may transmit the touch sensing signals of the $(n+1)^{th}$ and $(n+2)^{th}$ touch electrodes among the plurality of touch electrodes to the signal processing part 138 during the $(n+1)^{th}$ MUX period. Here, n is a natural number.

In addition, reduction in touch accuracy with respect to a specific frequency is prevented by changing a frequency for applying the touch scan signal TSS and detecting the touch sensing signal during the first to fifth MUX periods MP1 to MP5.

For example, the touch scan signal TSS and the touch sensing signal may be driven with a first frequency during the first, third and fifth MUX periods MP1, MP3 and MP5 and may be driven with a second frequency different from the first frequency during the second and fourth MUX periods MP2 and MP4. Since at least one of the first and second frequencies is different from a frequency of a transient noise component, deterioration in ability of sensing a touch due to the noise component of the specific frequency is prevented even when the noise component is inputted from an exterior.

The touch variance calculated by the signal processing part 138 during the first to fifth MUX periods MP1 to MP5 includes the touch sensing signals of at least two among the plurality of touch electrodes TE1 to TE58. Accordingly, when the signal processing part 138 judges that the touch is inputted from the touch variance, the coordinate calculating part 140 may select one having the touch among the at least two of the plurality of touch electrodes TE11 to TE58 by comparing the touch variance of the first to fifth MUX periods MP1 to MP5 and may calculate the coordinates of the corresponding touch electrode.

For example, when a touch is inputted to the $31^{st}$ touch electrode TE31, the touch variance calculated from the touch sensing signal of the $11^{th}$ and $21^{st}$ touch electrodes TE11 and TE21 through the first MUX during the first MUX period MP1 is 0, the touch variance calculated from the touch sensing signal of the $21^{st}$ and $31^{st}$ touch electrodes TE21 and TE31 through the first MUX during the second MUX period MP2 is greater than 0, the touch variance calculated from the touch sensing signal of the $31^{st}$ and $41^{st}$ touch electrodes TE31 and TE41 through the first MUX during the third MUX period MP3 is greater than about 0, and the touch variance calculated from the touch sensing signal of the $41^{st}$ and $51^{st}$ touch electrodes TE41 and TE51 through the first MUX during the fourth MUX period MP4 is about 0.

The coordinate calculating part 140 may calculate the coordinates of the touch input from the touch variance of the first to fifth MUX periods MP1 to MP5. For example, the coordinate calculating part 140 may calculate the coordinates of the $31^{st}$ touch electrode TE31 as the coordinates of the touch input by judging that the touch input occurs on the $31^{st}$ touch electrode TE31 from the result that each of the touch variances of the second and third MUX periods MP2 and MP3 is greater than 0.

Alternatively, the coordinate calculating part 140 may calculate the coordinates of the $31^{st}$ touch electrode TE31 as the coordinates of the touch input by judging that the touch input occurs on the $31^{st}$ touch electrode TE31 from the result that the touch variance of the first MUX period MP1 is 0 and the touch variances of the second MUX period MP2 is greater than 0.

Although the plurality of touch electrodes exemplarily include the $11^{th}$ to $58^{th}$ touch electrodes TE11 to TE58 and the plurality of MUXs 132 exemplarily include the first to eighth MUXs in the embodiment of FIGS. 2 and 3 and TABLE 2, the number of the plurality of touch electrodes and the number of the plurality of MUXs may be variously changed in another embodiment.

For example, the plurality of touch electrodes may be disposed as a matrix shape of 45 rows by 7 columns, and the plurality of MUXs may include $1^{st}$ to $21^{st}$ MUXs each having a channel ratio of input and output terminals of 15:1.

The first input terminals of the $1^{st}$ to $21^{st}$ MUXs may be connected to the touch electrodes of a first sub-matrix of 3 rows by 7 columns (from the $1^{st}$ row of $1^{st}$ column to the $3^{rd}$ row of $7^{th}$ column), respectively, and the second input terminals of the $1^{st}$ to $21^{st}$ MUXs may be connected to the touch electrodes of a second sub-matrix of 3 rows by 7 columns (from the $4^{th}$ row of $1^{st}$ column to the $6^{th}$ row of $7^{th}$ column), respectively.

Similarly, the third to fifteenth input terminals of the $1^{st}$ to $21^{st}$ MUXs may be connected to the touch electrodes of a third sub-matrix of 3 rows by 7 columns (from the $7^{th}$ row of $1^{st}$ column to the $9^{th}$ row of $7^{th}$ column) to a fifteenth sub-matrix of 3 rows by 7 columns (from the $43^{th}$ row of $1^{st}$ column to the $45^{th}$ row of $7^{th}$ column), respectively.

Although two of the plurality of touch electrodes are exemplarily driven at the same time in the embodiment of FIGS. 2 and 3 and TABLE 2, three or more of the plurality of touch electrodes may be driven at the same time in another embodiment.

For example, during the first MUX period MP1, the touch scan signal TSS may be applied to the $11^{th}$, $21^{st}$ and $31^{st}$ touch electrodes TE11, TE21 and TE31 10 times and the corresponding touch sensing signal may be detected from the $11^{th}$, $21^{st}$ and $31^{st}$ touch electrodes TE11, TE21 and TE31 10 times. During the second MUX period MP2, the touch scan signal TSS may be applied to the $21^{st}$, $31^{st}$ and $41^{st}$ touch electrodes TE21, TE31 and TE41 10 times and the corresponding touch sensing signal may be detected from the $21^{st}$, $31^{st}$ and $41^{st}$ touch electrodes TE21, TE31 and TE41 10 times.

Similarly, during the third MUX period MP3, the touch scan signal TSS may be applied to the $31^{st}$, $41^{st}$ and $51^{st}$ touch electrodes TE31, TE41 and TE51 10 times and the corresponding touch sensing signal may be detected from the $31^{st}$, $41^{st}$ and $51^{st}$ touch electrodes TE31, TE41 and TE51 10 times. During the fourth MUX period MP4, the touch scan signal TSS may be applied to the $41^{st}$, $51^{st}$ and $11^{th}$ touch electrodes TE41, TE51 and TE11 10 times and the corresponding touch sensing signal may be detected from the $41^{st}$, $51^{st}$ and $11^{th}$ touch electrodes TE41, TE51 and TE11 10 times. During the fifth MUX period MP5, the touch scan signal TSS may be applied to the $51^{st}$, $11^{th}$ and $21^{st}$ touch electrodes TE51, TE11 and TE21 10 times and the corresponding touch sensing signal may be detected from the $51^{st}$, $11^{th}$ and $21^{st}$ touch electrodes TE51, TE11 and TE21 10 times.

The coordinate calculating part 140 may calculate the coordinates of the touch input from the touch variance of the first to fifth MUX periods MP1 to MP5. For example, the coordinate calculating part 140 may calculate the coordinates of the $31^{st}$ touch electrode TE31 as the coordinates of the touch input by judging that the touch input occurs on the $31^{st}$ touch electrode TE31 from the result that each of the touch variances of the first, second and third MUX periods MP1, MP2 and MP3 is greater than 0. Alternatively, the coordinate calculating part 140 may calculate the coordinates of the $31^{st}$ touch electrode TE31 as the coordinates of the touch input by judging that the touch input occurs on the $31^{st}$ touch electrode TE31 from the result that the touch variances of the fourth and fifth MUX period MP4 and MP5 are about 0 and the touch variance of the third MUX period MP3 is greater than 0.

Consequently, in the touch display device 110 according to an embodiment of the present disclosure, the plurality of MUXs 132 may transmit the touch scan signal TSS to at least two of the plurality of touch electrodes TE1 to TE58 during the plurality of MUX periods MP1 to MP5 of the touch period TP, respectively, N times and may transmit the touch sensing signal from at least two of the plurality of touch electrodes TE11 to TE58 to the analog front end part 134 n times. Here, n is a natural number. The signal processing part 138 may calculate the touch variance from the average value of the plurality of touch sensing signals, and the coordinate calculating part 140 may calculate the coordinates of the touch input from the touch variance of the plurality of MUX periods MP1 to MP5.

Here, since the touch sensing signal is transmitted from at least two of the plurality of touch electrodes TE11 to TE58 N times, the touch variance may be calculated by detecting the touch sensing signal from each of the plurality of touch electrodes TE11 to TE58 at least 2N times. Accordingly, the detection number of the touch sensing signal increases and the accuracy touch sensing of the touch display device 110 is improved.

In addition, since the touch scan signal TSS and the touch sensing signal are driven by changing the frequency during the plurality of MUX periods MP1 to MP5, deterioration of the touch accuracy with respect to a specific frequency of the touch display device 110 is prevented.

It will be apparent to those skilled in the art that various modifications and variations can be made in the touch display device and the method of driving the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
a touch display panel displaying an image and sensing a touch input;
a plurality of touch electrodes in the touch display panel;
a plurality of touch lines connected to the plurality of touch electrodes, respectively;
a plurality of MUXs connected to the plurality of touch lines, each of the plurality of MUXs transmitting a touch scan signal to at least two of the plurality of touch electrodes simultaneously and receiving a touch sensing signal from the at least two of the plurality of touch electrodes;
a signal processing part including an integrated circuit and configured to calculate a touch variance from the touch sensing signal; and
a coordinate calculating part including a microcontroller and configured to calculate coordinates of the touch input from the touch variance,
wherein the plurality of MUXs:
transmit the touch sensing signal of $n^{th}$ and $(n+1)^{th}$ touch electrodes of the plurality of touch electrodes to the signal processing part during an $n^{th}$ MUX period, wherein n is a natural number; and
transmit the touch sensing signal of $(n+1)^{th}$ and $(n+2)^{th}$ touch electrodes of the plurality of touch electrodes to the signal processing part during an $(n+1)^{th}$ MUX period,
wherein when the touch input occurs on the $n^{th}$ touch electrode, the coordinate calculating part calculates a position of the $n^{th}$ touch electrode as the coordinates of the touch input by judging that the touch input occurs on the $n^{th}$ touch electrode from the touch sensing signal of the $n^{th}$ and $(n+1)^{th}$ touch electrodes and the touch sensing signal of the $(n+1)^{th}$ and $(n+2)^{th}$ touch electrodes.

2. The touch display device of claim 1, wherein the plurality of MUXs:
transmit a pulse of the touch scan signal to the $n^{th}$ and $(n+1)^{th}$ touch electrodes N times and receive the touch sensing signal from the $n^{th}$ and $(n+1)^{th}$ touch electrodes N times during the $n^{th}$ MUX period, wherein n is a natural number; and
transmit a pulse of the touch scan signal to the $(n+1)^{th}$ and $(n+2)^{th}$ touch electrodes N times and receive the touch sensing signal from the $(n+1)^{th}$ and $(n+2)^{th}$ touch electrodes N times during the $(n+1)^{th}$ MUX period.

3. The touch display device of claim 1, wherein the touch scan signal is driven with a first frequency during the $n^{th}$ MUX period, and the touch scan signal is driven with a second frequency different from the first frequency during the $(n+1)^{th}$ MUX period.

4. The touch display device of claim 1, further comprising:
an analog front end part receiving the touch sensing signal from the plurality of MUXs; and
an analog-digital converting part converting the touch sensing signal of an analog type to the touch sensing signal of a digital type.

5. A method of driving a touch display device, comprising:
transmitting a touch scan signal to at least two of a plurality of touch electrodes of a touch display panel simultaneously and receiving a touch sensing signal from the at least two of the plurality of touch electrodes by each of a plurality of MUXs;
calculating a touch variance from the touch sensing signal by a signal processing part; and
calculating coordinates of a touch input from the touch variance by a coordinate calculating part,
wherein receiving the touch sensing signal by each of the plurality of MUXs comprises:
transmitting the touch sensing signal of $n^{th}$ and $(n+1)^{th}$ touch electrodes of the plurality of touch electrodes to the signal processing part during an $n^{th}$ MUX period, wherein n is a natural number; and
transmitting the touch sensing signal of $(n+1)^{th}$ and $(n+2)^{th}$ touch electrodes of the plurality of touch electrodes to the signal processing part during an $(n+1)^{th}$ MUX period,
wherein calculating the coordinates of the touch input by the coordinate calculating part comprises:
when the touch input occurs on the $n^{th}$ touch electrode, calculating a position of the $n^{th}$ touch electrode as the coordinates of the touch input by judging that the touch input occurs on the $n^{th}$ touch electrode from the touch sensing signal of the $n^{th}$ and $(n+1)^{th}$ touch electrodes and the touch sensing signal of the $(n+1)^{th}$ and $(n+2)^{th}$ touch electrodes by the coordinate calculating part.

6. The method of claim 5, wherein transmitting the touch scan signal and receiving the touch sensing signal by each of the plurality of MUXs comprises:
transmitting a pulse of the touch scan signal to the $n^{th}$ and $(n+1)^{th}$ touch electrodes N times and receiving the touch sensing signal from the $n^{th}$ and $(n+1)^{th}$ touch electrodes N times during the $n^{th}$ MUX period, wherein n is a natural number; and
transmitting a pulse of the touch scan signal to the $(n+1)^{th}$ and $(n+2)^{th}$ touch electrodes N times and receiving the touch sensing signal from the $(n+1)^{th}$ and $(n+2)^{th}$ touch electrodes N times during the $(n+1)^{th}$ MUX period.

7. The method of claim 5, wherein the touch scan signal is driven with a first frequency during the $n^{th}$ MUX period, and the touch scan signal is driven with a second frequency different from the first frequency during the $(n+1)^{th}$ MUX period.

8. The method of claim 5, further comprising:
receiving the touch sensing signal from the plurality of MUXs by an analog front end part; and
converting the touch sensing signal of an analog type to the touch sensing signal of a digital type by an analog-digital converting part.

9. The touch display device of claim 1, wherein when the touch variance calculated from the touch sensing signal of the $n^{th}$ and $(n+1)^{th}$ touch electrodes is greater than zero and the touch variance calculated from the touch sensing signal of the $(n+1)^{th}$ and $(n+2)^{th}$ touch electrodes is zero, the coordinate calculating part calculates a position of the $n^{th}$ touch electrode as the coordinates of the touch input.

10. A touch display device, comprising:
a touch display panel displaying an image and sensing a touch input;
a plurality of touch electrodes in the touch display panel;
a plurality of touch lines connected to the plurality of touch electrodes, respectively;
a plurality of MUXs connected to the plurality of touch lines, each of the plurality of MUXs transmitting a touch scan signal to at least two of the plurality of touch electrodes simultaneously and receiving a touch sensing signal from the at least two of the plurality of touch electrodes;

a signal processing part including an integrated circuit and configured to calculate a touch variance from the touch sensing signal; and a coordinate calculating part including a microcontroller and configured to calculate coordinates of the touch input from the touch variance, wherein the plurality of MUXs:
  transmit the touch sensing signal of $n^{th}$ and $(n+1)^{th}$ touch electrodes of the plurality of touch electrodes to the signal processing part during an $n^{th}$ MUX period, wherein n is a natural number; and
  transmit the touch sensing signal of $(n+1)^{th}$ and $(n+2)^{th}$ touch electrodes of the plurality of touch electrodes to the signal processing part during an $(n+1)^{th}$ MUX period, wherein when the touch variance calculated from the touch sensing signal of the $n^{th}$ and $(n+1)^{th}$ touch electrodes is greater than zero and the touch variance calculated from the touch sensing signal of the $(n+1)^{th}$ and $(n+2)^{th}$ touch electrodes is greater than zero, the coordinate calculating part calculates a position of the $(n+1)^{th}$ touch electrode as the coordinates of the touch input.

* * * * *